R. W. FIELDWICK.
MICROMETER MEASURING INSTRUMENT.
APPLICATION FILED SEPT. 13, 1915.

1,205,726. Patented Nov. 21, 1916.

INVENTOR
Robert William Fieldwick
BY
ATTORNEYS

UNITED STATES PATENT OFFICE.

ROBERT WILLIAM FIELDWICK, OF LONDON, ENGLAND.

MICROMETER MEASURING INSTRUMENT.

1,205,726.

Specification of Letters Patent.

Patented Nov. 21, 1916.

Application filed September 13, 1915. Serial No. 50,383.

*To all whom it may concern:*

Be it known that I, ROBERT WILLIAM FIELDWICK, a subject of the King of Great Britain and Ireland, residing at Cromer House, 170 Upper Richmond road, Putney, London, S. W., England, have invented certain new and useful Improvements Relating to Micrometer Measuring Instruments, of which the following is a specification.

This invention has for its object to provide improved means whereby an ordinary screw-operated micrometer caliper may be used as a "go" and "not go" limit gage having any desired tolerance, such tolerance being not greater than that which is permitted by an almost complete revolution of the micrometer adjusting piece.

Figure 1:
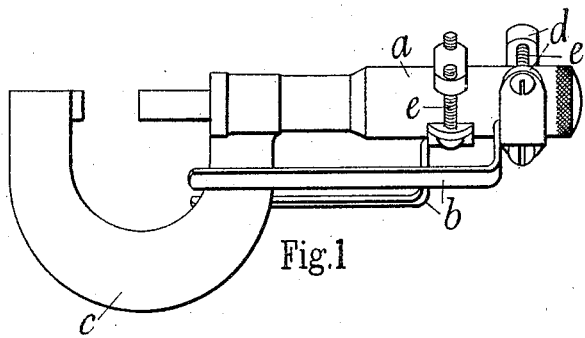
Figure 2:
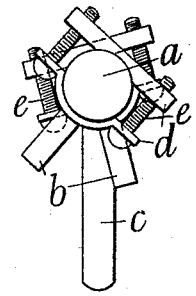
Figure 3:
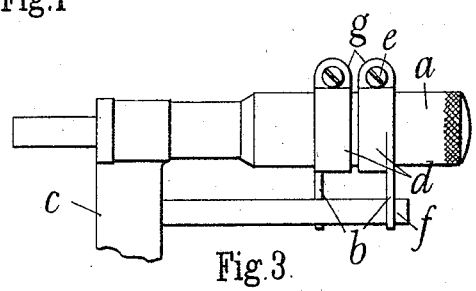
Figure 4:
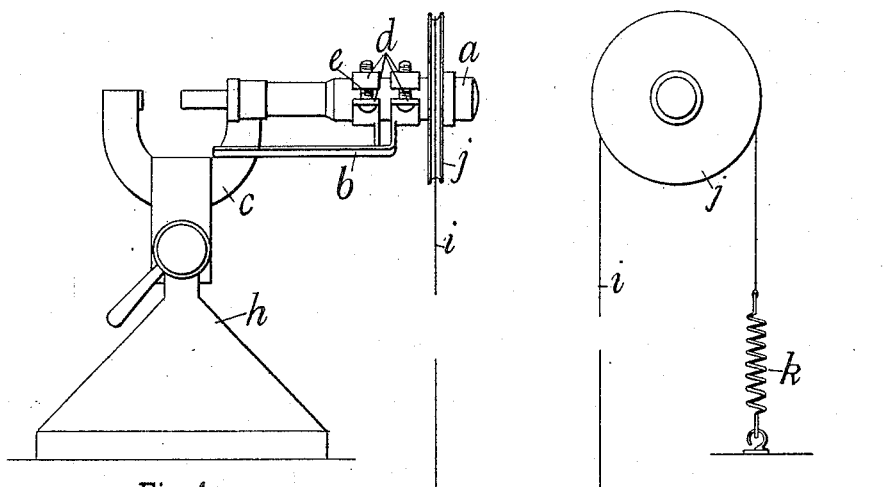
Figure 5:
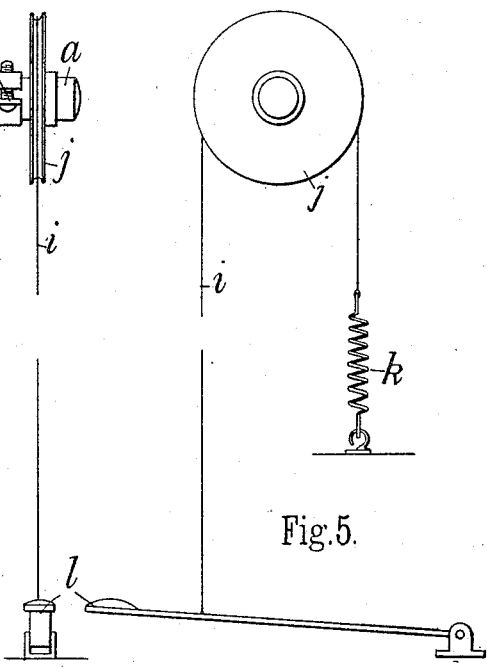

Referring to the two accompanying sheets of explanatory drawings, Figure 1 is a front elevation and Fig. 2 an end elevation of a micrometer caliper provided with this invention. Fig. 3 is a front elevation of a portion of the caliper showing a modified construction. Fig. 4 is a front elevation showing the caliper mounted on a bench support and adapted to be operated by a foot lever, and Fig. 5 is a side elevation of the operating mechanism.

The same reference letters in the different views indicate the same or similar parts.

In carrying out my invention as applied to an ordinary standard screw-operated micrometer caliper as shown in Figs. 1 and 2, I secure on the thimble or rotatable adjusting piece $a$ of the micrometer by means of adjustable screw clamps, a pair of movable arms or stops $b$ which for the greater part extend along the main part of the instrument in a direction parallel with the center line of the micrometer screw and thimble. Both stops move with the adjusting piece and either can be made to abut against one side of the said main portion or frame $c$ which serves as a fixed stop. One of the movable stops is set to abut against the front of the instrument frame or main portion at the "go," or high limit position of the caliper, and the other movable stop is set to abut against the back of the main portion at the "not go," or low limit position. Preferably the screw clamp of each stop comprises a pair of parts $d$ adapted to embrace or partially embrace the piece $a$ and a pair of screws $e$ whereby such parts can be tightened on the said piece.

In the modification shown in Fig. 3, I construct each movable stop $b$ in the form of a short radial arm and provide on the main portion $c$ of the micrometer caliper or upon a holding device for the same, a projecting fixed stop $f$ against which either of the movable stops can abut. In this illustration a modified form of screw clamp is also shown. Such clamp consists of a flexible divided metal band $d$ through the lugs $g$ of which a tightening screw $e$ is inserted. This form of clamp may be used with the stops shown in Figs. 1 and 2, and is also shown in Figs. 6 and 7.

In the initial setting of the instrument the movable stop clamps are released and the caliper is set to, say, the high limit position while one of the stops is held in contact with the front of the main portion or the projecting fixed stop, and the movable stop is afterward secured on the thimble by the tightening of its clamp. Then the caliper is adjusted to the low limit position while the other movable stop is in contact with the back of the main portion or projecting fixed stop, and afterward this movable stop is also secured. The movement of the caliper is then limited to an extent corresponding to the rotation of the thimble permitted by the stops which is equal to the tolerance or difference between the "go" and "not go" dimensions.

When it is desired to leave both hands of the operator free the instrument frame is clamped in a rigid holding or supporting device $h$ fixed to the viewing bench, and a light band or cord $i$ is passed over a pulley $j$ arranged upon the thimble in such a manner that when one end of the cord is pulled the thimble is rotated until one of the movable stops comes into operation, while when the other end of the cord is pulled, the thimble is rotated until the other movable stop comes into operation.

The above device may be operated by foot or knee pressure, by the arrangement of a light spring $k$ to give a small constant pull upon one end of the cord, and a lever or pedal $l$, acting directly or through a spring on the other end of the cord.

Having thus described my invention what I claim as new and desire to secure by Letters Patent is:—

1. The combination with a screw-operated micrometer caliper fitted with a rotatable adjusting piece, of a pair of adjustable stops mounted on the said piece, and clamps for securing the stops on the adjusting piece, substantially as set forth.

2. The combination with a screw-operated micrometer caliper fitted with a rotatable adjusting piece, of a pair of adjustable stops mounted on the said piece and adapted to abut on opposite sides of the frame of the caliper, and clamps for securing the stops on the adjusting piece, substantially as set forth.

3. The combination with a screw-operated micrometer caliper fitted with a rotatable adjusting piece, of a pair of adjustable stops mounted on the said piece, clamps for securing the stops on the adjusting piece, a support for the caliper, and means for operating the adjusting piece, said means comprising a pulley on the adjusting piece, a cord passing over said pulley, and a spring and lever respectively connected to opposite ends of the cord, substantially as set forth.

In testimony whereof I have signed my name to this specification.

ROBERT WILLIAM FIELDWICK.

Copies of this patent may be obtained for five cents each, by addressing the "Commissioner of Patents, Washington, D C."